(12) United States Patent
Tatian et al.

(10) Patent No.: US 6,333,811 B1
(45) Date of Patent: Dec. 25, 2001

(54) ALL-REFLECTIVE ZOOM OPTICAL IMAGING SYSTEM

(75) Inventors: Berge Tatian, Stoneham; Richard Wientzen, Chelmsford, both of MA (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 08/281,794

(22) Filed: Jul. 28, 1994

(51) Int. Cl.$^7$ .................. G02B 17/00; G02B 5/10
(52) U.S. Cl. .............. 359/366; 359/365; 359/728; 359/729; 359/859
(58) Field of Search .................. 359/364, 365, 359/366, 729, 731, 859, 861, 728

(56) References Cited

U.S. PATENT DOCUMENTS

| | | |
|---|---|---|
| 3,274,886 | 9/1966 | Rosin . |
| 3,519,325 | 7/1970 | Abel et al. . |
| 3,529,888 | 9/1970 | Buchroeder . |
| 3,674,334 * | 7/1972 | Offner ................... 359/466 |
| 4,235,508 | 11/1980 | Kaprelian ............... 350/27 |
| 4,693,569 | 9/1987 | Offner ................... 350/505 |
| 4,804,258 | 2/1989 | Kebo .................... 350/505 |
| 4,812,030 | 3/1989 | Pinson .................. 350/620 |
| 4,906,078 | 3/1990 | Inabata et al. ......... 350/423 |
| 4,934,801 | 6/1990 | Mercado ................ 350/572 |
| 4,964,706 | 10/1990 | Cook .................... 350/505 |
| 4,971,428 | 11/1990 | Moskovich ............. 350/442 |
| 4,993,818 | 2/1991 | Cook .................... 350/505 |
| 5,089,910 | 2/1992 | Sigler .................. 359/399 |
| 5,144,476 | 9/1992 | Kebo .................... 359/366 |

FOREIGN PATENT DOCUMENTS 58-205124   11/1983   (JP) .

* cited by examiner

*Primary Examiner*—Audrey Chang
*Assistant Examiner*—Jennifer Winstedt

(57) ABSTRACT

An all-reflective zoom optical system is disclosed. The system comprises a plurality of curved relay mirrors successively reflecting electromagnetic radiation received by the system to generate a real image with electromagnetic radiation on a focal surface that is fixed across the zoom range. Further, the entrance aperture also is constant for any zoom position. The curved relay mirrors are movable in relationship to each other in mutually parallel tracks to effect the magnification. The system further includes a primary and secondary mirror for collecting and reflecting incoming electromagnetic radiation to the curved relay mirrors.

27 Claims, 12 Drawing Sheets

ALL-REFLECTIVE ZOOM OPTICAL IMAGING SYSTEM

BACKGROUND OF THE INVENTION

Some earth-orbiting satellites contain optical imaging systems for tracking earth-bound targets. Generally, these systems generate real images that are converted into electrical signals and transmitted to the ground.

Depending upon the satellite's angle of inclination in relationship to the earth, the distance between the satellite and an earthbound target will vary. As a result, the image size of fixed sized objects will also change. A similar effect arises in scanning telescopic systems in aircraft. Here, as the telescope scans the terrain over which the aircraft is passing, depending on the telescope's angle inclination, the changing distance between the telescope and the various targets affect the relative image sizes.

The solution to maintaining image size independent of the distance between the satellite and the target is to use a zoom optical system that can increase magnification in response to the satellite's angle of inclination relative to the earth. One problem that arises, however, is the fact that traditional zoom optical systems have utilized refractive optical elements. Optical glass is the preferred material for refractive lenses, but this is restricted in wavelength from 500 to 950 nm. A few materials are available for wavelengths outside of the range but these have severe limitations in size and durability. One of the major defects of refractive optics is chromatic aberration which becomes more serious as the wavelength band increases. If this is a problem for a particular application, one has to use several lenses made of different materials which increases the weight of the optics. The weight of refractive optics is a problem in any event because refractive lenses are not lightweight as in the case of mirrors. Refractive optics are also much more susceptible to thermal effects than reflective optics, and controlling to thermal environment in space or airborne systems is not an easy task. A final problem in refractive optics relative to reflective optics is that they are subject to the deleterious effects of radiation because the light has to go through the material of which the lens is made, and the optical characteristic of materials are more sensitive to radiation effects than their physical characteristics.

SUMMARY OF THE INVENTION

An all-reflective zoom optical system solves the above-identified problems. Such a system comprises a plurality of curved relay mirrors successively reflecting electromagnetic radiation received by the system to generate a real image with the electromagnetic radiation at a focal surface. These curved relay mirrors are movable in relationship to each other in order to effect magnification.

In a particular embodiment of this invention, the focal surface remains fixed as the curved relay mirrors move in relationship to each other in order to change the magnification. Further, the entrance aperture is constant across the zoom range. Also in the embodiment of the invention, the optical system further comprises a primary mirror for collecting and reflecting received electromagnetic radiation and a secondary mirror for receiving the electromagnetic radiation from the primary and reflecting the electromagnetic radiation to the curved relay mirrors.

In other embodiments, the curved relay mirrors comprise a first relay mirror, a second relay mirror receiving the electromagnetic radiation from the first relay mirror, a third relay mirror receiving the electromagnetic radiation from the second relay mirror, and a fourth relay mirror receiving the electromagnetic radiation from the third relay mirror and reflecting the electromagnetic radiation onto the focal surface. The first and fourth relay mirrors have aspheric curvatures with only bilateral symmetry. The second relay mirror has a convex curvature. Of the mirrors, only the second and the third relay mirrors move to effect the magnification. Further, these mirrors move in parallel tracks. The third relay mirror has a spherical curvature. Finally, the focal surface has an aspheric curvature with only bilateral symmetry.

According to a different aspect of the invention, the system comprises relay mirrors successively reflecting electromagnetic radiation received by the system to generate a real image at a fixed focal surface. These relay mirrors are removable in relationship to each other in order to effect the magnification.

According to another aspect of the invention, a reflective zoom optical system comprises a primary mirror for collecting electromagnetic radiation, a stationary secondary mirror co-axial with the primary mirror for receiving the electromagnetic radiation from the primary mirror and a plurality of curved relay mirrors positioned behind the primary mirror for receiving and successively reflecting the electromagnetic radiation. These curved relay mirrors are movable in relationship to each other in order to effect magnification.

According to a particular embodiment of the invention, the curved relay mirrors generate a real image at an focal surface. Still further, the focal surface remains fixed as the curved relay mirrors move in relationship to each other producing the change in magnification.

The above and other features of the invention including various novel details of construction and combinations of parts will now be more particularly described with reference to the accompanying drawings and pointed out in the claims. It will be understood that the particular all-reflective zoom optical imaging system embodying the invention shown by way of illustration and not as a limitation of the invention. The principles and features of this invention may be employed and varied in numerous embodiments without departing from the scope of the invention.

DETAILED DESCRIPTION OF THE INVENTION

Figure 1:
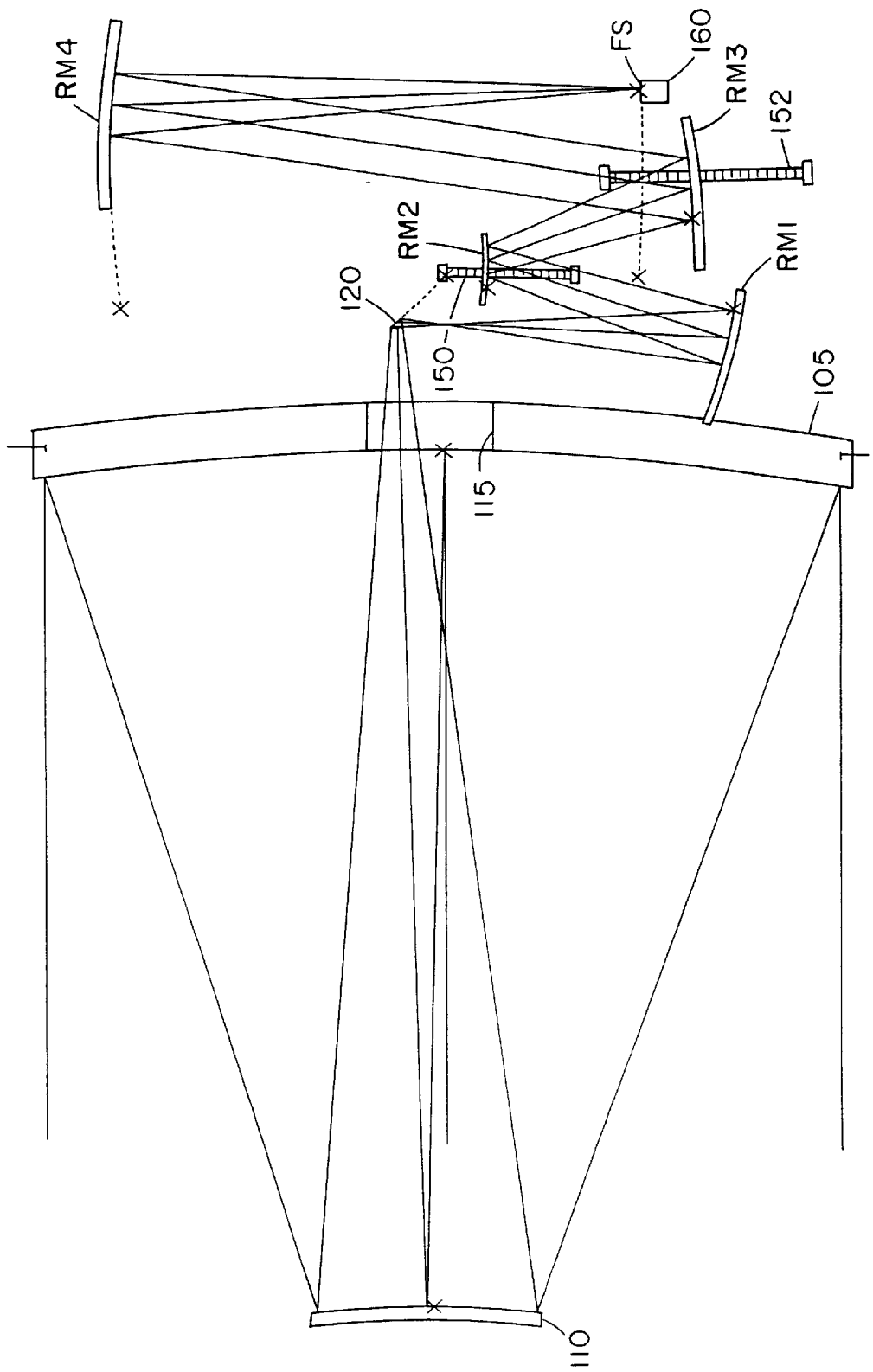
FIG. 1 is a side view of the first embodiment of the zoom optical reflective system at an intermediate zoom position.

A first embodiment of an all-reflective zoom optical system constructed according to principles of the present invention is generally illustrated in FIGS. 1 through 4. Here, a primary mirror 105 receives light entering the optical system through an entrance aperture. The light reflected from the primary mirror 105 is focused towards a secondary mirror 110 co-axial and in front of the primary mirror 105. The primary and secondary mirrors 105, 110 yield a Cassegrain front end, although a Gregorian would also be possible.

The secondary mirror 110 reflects the light axially through an aperture 115 formed in the primary mirror to fold mirror 120, which reflects the light laterally parallel to the back of the primary mirror. A first relay mirror RM1 is positioned to receive the light. The first relay mirror RM1 is constrained to have a positive curvature because of the natural aperture growth after an image when the pupil image is virtual, and the large amount of field curvature due to the Petzval sum and astigmatism.

A second relay mirror RM2 receives and reflects light from the first relay mirror RM1. This second relay mirror RM2 is aspheric and convex. A third relay mirror RM3 receives light reflected from the second relay mirror RM2. These second and third relay mirrors RM2, RM3 are movable along mutually parallel straight tracks 150, 152 to provide the zoom function. The curvature of the third relay mirror RM3 is spherical. An aspheric fourth relay mirror RM4 reflects light from the third relay mirror RM3 onto an stationary focal surface FS where a detector assembly 160 such as charged-coupled device, for example, converts the resulting real image into an electrical signal. The stationary focal surface is very important in view of the difficulties associated with moving the detector assembly during zooming. The curvature of the focal surface FS is also aspheric with only bilaterally symmetry. As demonstrated by the following tables, however, the curvature of the focal surface is small. This feature is advantageous because focal plane detectors are expensive and difficult to make. With a relatively flat focal surface, it is possible to construct the detector assembly from several flat sections butted together.

Although the focal surface FS does not change or move as zoom progresses, the line of sight changes by several tenths of a degree. Also, the entrance aperture is constant across the zoom range. This is important because the angular resolution is directly proportional to the size of the entrance pupil, and since the primary mirror is the largest and most expensive part of the system, this mirror should be utilized to the fullest extent possible.

Figure 2:
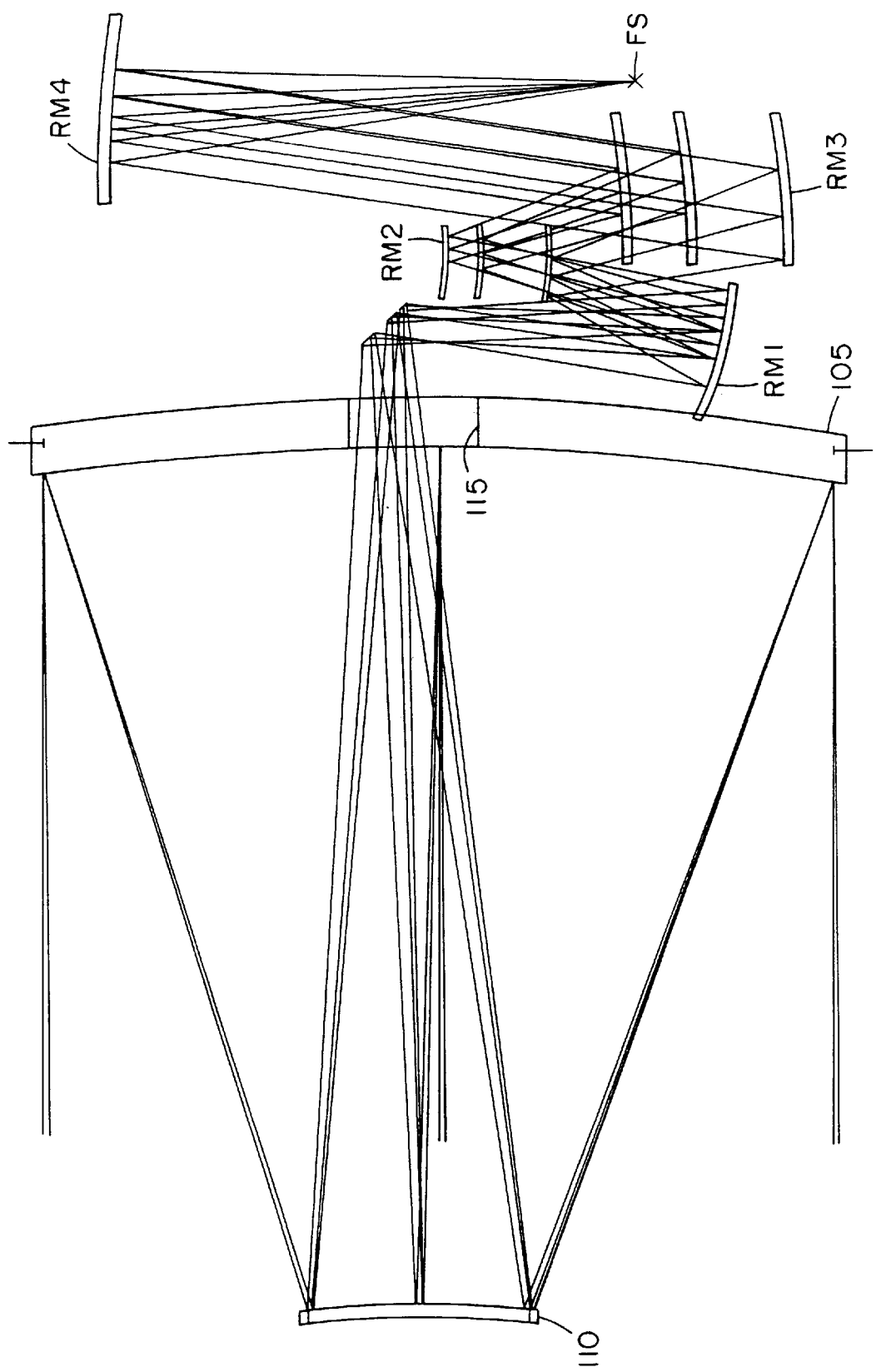
FIG. 2 is a side view of the first embodiment of the inventive system showing three exemplary zoom positions.

As illustrated by FIG. 2, only the second and third relay mirrors RM2, RM3 are moved to yield the zoom function. This eases the mechanical requirements because any motions of optical elements must be extremely precise. This is especially true for the larger mirrors, such as the primary 105, secondary 110, and first relay mirror RM1. These being fixed in relationship to each other makes their mounting straight forward. Further, since the tracks 150, 152 on which the second and third relay mirrors RM2, RM3 move are straight and mutually parallel, the mechanisms for affecting the motion of these mirrors are considerably simplified.

Figure 3:
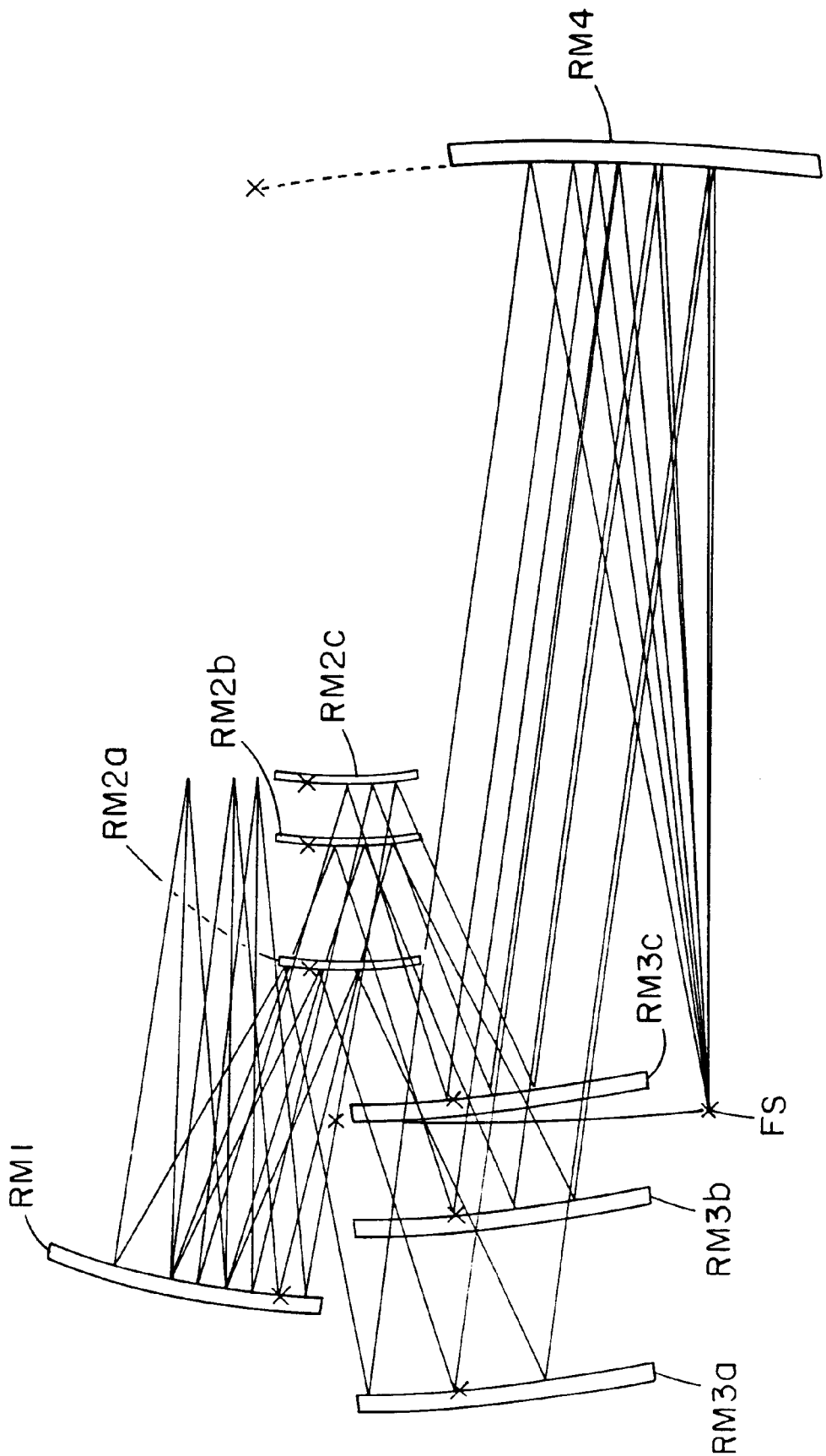
FIG. 3 is a side view of the relay mirrors of the first embodiment at the three zoom positions.

Specifically, FIG. 2 shows three possible positions of the second and third relay mirrors RM2, RM3 for f-stops of 5.7, 8.5, and 11.4. FIG. 3 shows only the four relay mirrors at the three f-stop positions. Specifically, if the second and third relay mirrors are at positions RM2$a$ and RM3$a$, the effective f-stop is 5.7. Positions RM2$b$ and RM3$b$ yield an f-stop of 8.5, and RM2$c$ and RM3$c$ give an f-stop of 11.4.

The following Tables I and II describe the curvature of the mirrors of a first embodiment system having a normalized focal length of 100–200 lens units, a field of view of 2.2–1.1 degrees, and an entrance aperture of 17.5 lens units.

TABLE I

| Description | Radius | Thickness | Index | Tilt | Decenter |
| --- | --- | --- | --- | --- | --- |
| Primary | −47.744 | −17.2644 | −1.0 | — | — |
| Secondary | −19.3672 | 20.7774 | +1.0 | 0.005170 | 0.042333 |
| Fold Mirror | (infinite) | −5.5419 | −1.0 | −0.7854* | — |
| RM1 | 7.0472 | 3.4674 | +1.0 | −0.15532 | 0.6082 |
| RM2 | 4.3304 | −4.4973 | −1.0 | 0.10449 | 0.23653 |
| RM3 | 16.1565 | 12.7995 | +1.0 | 0.073625 | −1.21610 |
| RM4 | −21.2053 | 9.9083 | −1.0 | 0.13569 | 0.68968 |
| FS | 35.4484 | — | — | −0.056379 | — |

*Axis tilt of 1.5708 radius

TABLE II

| | ASPHERIC SURFACES | | |
| --- | --- | --- | --- |
| | Conic Constant | A4 | A6 |
| Primary | −0.884204 | 0.141753E-6 | −0.738707E-11 |
| Secondary | −6.87123 | −0.524331E-4 | 0.519850E-6 |
| RM3 | −4.93398 | 0.111101E-3 | −0.716056E-6 |

The first and fourth relay mirrors RM1, RM4 and the focal surface FS have complex aspheric curvatures such that they only have bilateral symmetry. Thus, the following equation and variable list in Table III define the surface curvature (Z) as the sag, depth from a flat plane for the first and fourth relay mirrors RM1, RM4, and the focal surface FS.

$$Z = \left\{ \frac{\alpha - \beta}{(1 - C_z\alpha)^{1/2} + (1 - C_z\beta)^{1/2}} \right\} +$$

$$U_4\alpha^2(\alpha^2 - \beta^2) + U_6\alpha^3(\alpha^3 - \beta^3) + U_8\alpha^4(\alpha^4 - \beta^4) +$$

$$A_1y^3 + A_2x^2y +$$

$$A_3y^4 + A_4x^2y^2 + A_5x^4 +$$

$$A_6y^5 + A_7x^2y^3 + A_8x^4y +$$

$$A_9y^6 + A_{10}x^2y^4 + A_{11}x^4y^2 + A_{12}x^6 +$$

$$A_{13}y^7 + A_{14}x^2y^5 + A_{15}x^4y^3 + A_{16}x^6y +$$

$$A_{17}y^8 + A_{18}x^2y^6 + A_{19}x^4y^4 + A_{20}x^6y^2 + A_{21}x^8 +$$

$$A_{22}y^9 + A_{23}x^2y^7 + A_{24}x^4y^5 + A_{25}x^6y^3 + A_{26}x^8y +$$

$$A_{27}y^{10} + A_{28}x^2y^8 + A_{29}x^4y^6 + A_{30}x^6y^4 + A_{31}x^8y^2 + A_{32}x^{10}$$

$$\alpha = C_x(x - x_0)^2 + C_y(y - y_0)^2$$

$$\beta = C_xx_0^2 = C_yy_0^2$$

$$\gamma = 1/\sqrt{C_x^2 + C_y^2}$$

TABLE III

VARIABLE LIST

| | | | |
|---|---|---|---|
| RM1 | CX = 1.41917194E-1 | CY = 1.41824485E-1 | CZ = -9.30309262E-4 |
| | X0 = 0.00000000000 | Y0 = 0.445660962 | |
| | U4 = 5.4787809E-4 | U6 = 9.33809254E-6 | U8 = 0.00000000 |
| | U10 = 0.0000000 | A1 = -3.08178439E-4 | A2 = 6.03435251E-5 |
| | A3 = 1.9955499E-5 | A4 = -1.39060583E-5 | A5 = 2.42786600E-6 |
| | A6 = 0.0000000 | A7 = 0.00000000 | A8 = 0.00000000 |
| | A9 = -2.9945348E-7 | A1 = 1.33395986E-4 | A11 = 9.32324104E-6 |
| | A12 = -1.6926475E-5 | A13 = 4.61743259E-6 | A14 = 0.00000000 |
| | A15 = 0.0000000 | A16 = 0.00000000 | A17 = 6.98827096E-5 |
| | A18 = -3.3252476E-6 | A19 = -5.81910633E-7 | A20 = 2.16719860E-7 |
| | A21 = 0.00000000 | A22 = 0.00000000 | A23 = 0.0000000 |
| | A24 = 5.2686499E-7 | A25 = 2.16014672E-7 | A26 = 0.0000000 |
| | A27 = 0.00000000 | A28 = 0.00000000 | A29 = 0.0000000 |
| | A30 = 0.00000000 | A31 = 0.00000000 | A30 = 0.0000000 |
| RM4 | CX = -5.0317739E-2 | CY = -4.43746207E-2 | CZ = -2.83395355E-4 |
| | X0 = 0.00000000 | Y0 = 0.330973591 | |
| | U4 = 5.4659765E-5 | U6 = 7.92740345E-7 | U8 = 0.000000000 |
| | U10 = 0.00000000 | A1 = 8.29030409E-4 | A2 = 9.43869569E-5 |
| | A3 = 8.0814757E-6 | A4 = -1.72817754E-7 | A5 = -5.1817582AE-8 |
| | A6 = 0.00000000 | A7 = 0.000000000 | A8 = 0.000000000 |
| | A9 = 7.4436903E-5 | A10 = -4.01938503E-5 | A11 = 9.71503596E-6 |
| | A12 = 1.5981259E-6 | A13 = 2.73891567E-8 | A14 = 0.000000000 |
| | A15 = 0.00000000 | A16 = 0.000000000 | A17 = -4.40484774E-5 |
| | A18 = 1.1386030E-6 | A19 = 9.21649842E-7 | A20 = -6.4074787E-10 |
| | A21 = 0.00000000 | A22 = 0.000000000 | A23 = 0.000000000 |
| | A24 = 3.3804981E-7 | A25 = -2.2291977E-11 | A26 = 0.000000000 |
| | A27 = 0.00000000 | A28 = 0.000000000 | A29 = 0.000000000 |
| | A30 = 0.00000000 | A31 = 0.000000000 | A32 = 0.000000000 |
| FS | CX = 2.8213747E-2 | CY = 2.82137427E-2 | CZ = 9.88486234E-2 |
| | X0 = 0.00000000 | Y0 = 0.295266260 | |
| | U4 = 0.00000000 | U6 = 0.000000000 | U8 = 0.000000000 |
| | U10 = 0.00000000 | A1 = 0.000000000 | A2 = 0.000000000 |
| | A3 = 0.00000000 | A4 = 0.000000000 | A5 = 0.000000000 |
| | A6 = 0.00000000 | A7 = 0.000000000 | A8 = 0.000000000 |
| | A9 = 3.19680393E-3 | A10 = 0.000000000 | A11 = 0.000000000 |
| | A12 = 0.00000000 | A13 = 0.000000000 | A14 = 0.000000000 |
| | A15 = 0.00000000 | A16 = 0.000000000 | A17 = -4.89804420E-2 |
| | A18 = -1.31987997E-2 | A19 = 0.000000000 | A20 = 0.000000000 |
| | A21 = 0.00000000 | A22 = 0.000000000 | A23 = 0.000000000 |
| | A24 = 1.56793790E-4 | A25 = 0.000000000 | A26 = 0.000000000 |
| | A27 = 0.00000000 | A28 = 0.000000000 | A29 = 0.000000000 |
| | A30 = 0.00000000 | A31 = 0.000000000 | A32 = 0.000000000 |

Figure 4:
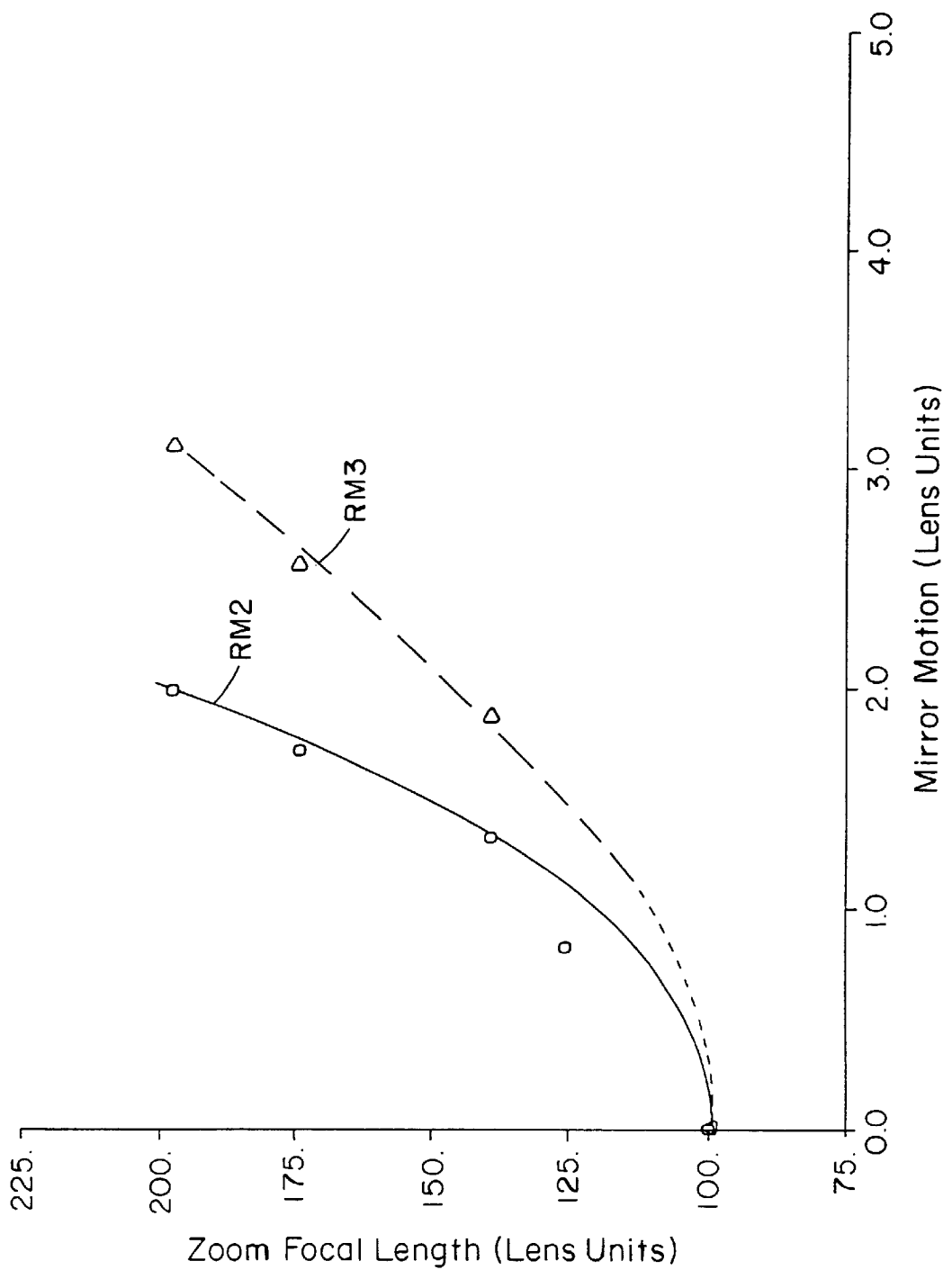
FIG. 4 is a graph illustrating focal length as a function of mirror motion for the second and third relay mirror in the first embodiment.

FIG. 4 shows the focal length of the system as a function of mirror motion of the second and third relay mirrors RM2, RM3 in the normalized scale of the lens units.

In some applications, the relay mirrors RM1, RM2, RM3, RM4 shown in FIG. 3 could be retrofitted into a existing conventional Cassegrain front-end optical system. In this situation, the curvatures may require adjustments to optimize the resulting system.

Figure 5:
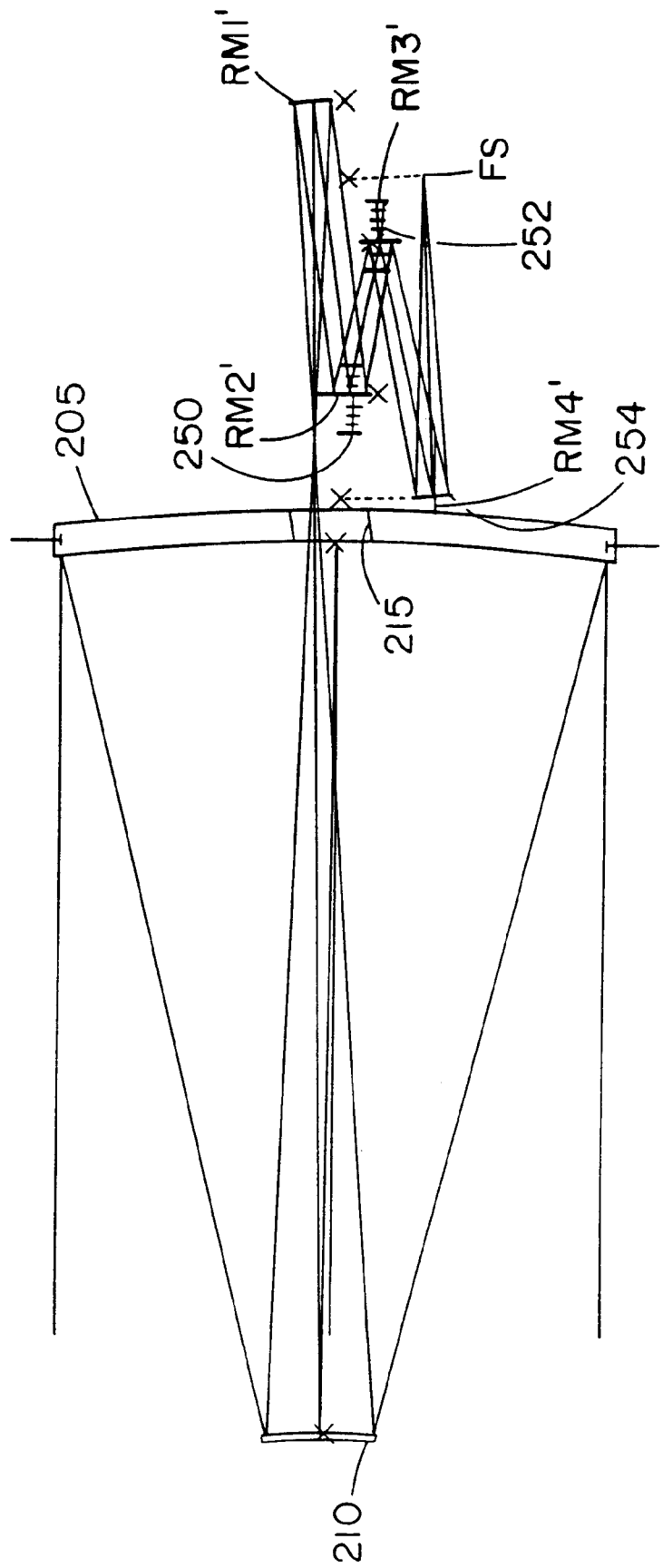
FIG. 5 is a side view of the second embodiment of the inventive zoom optical reflective system at an intermediate zoom position.
Figure 6:
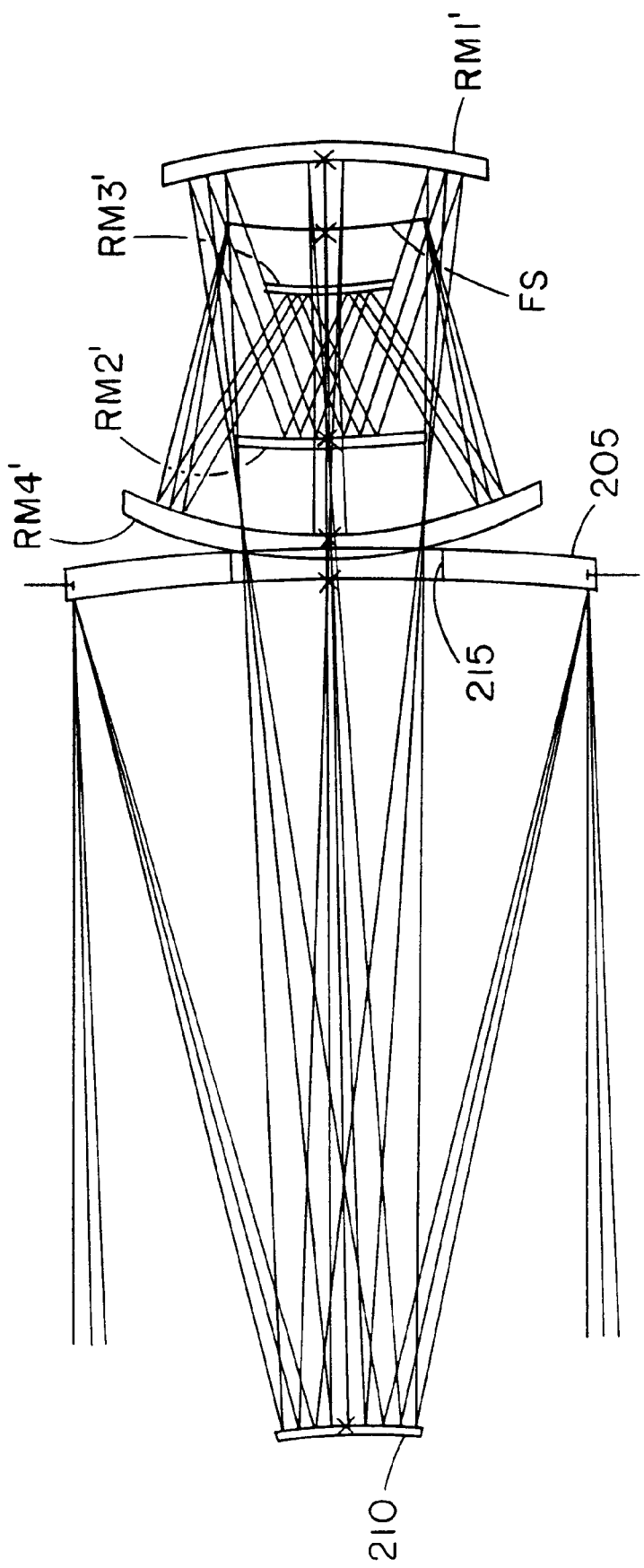
FIG. 6 is a top view of the second embodiment of the zoom optical reflective system at an intermediate zoom position.

A second embodiment of an all-reflective zoom optical system is generally shown in FIGS. 5 and 6, which illustrate a side and top views, respectively. This system is generally similar to the first embodiment except that the fourth relay mirror is not stationary. Here, a primary mirror 205 receives light entering the optical system through an entrance aperture. The curvature of the primary mirror 205 is close to parabolic.

The light the primary mirror 205 collects is reflected and focused toward a secondary mirror 210 coaxial and in front of the primary mirror 205. This secondary mirror 210 is convex with an essentially hyperbolic curvature.

The light reflecting off the secondary mirror 210 is reflected axially through an aperture 215 formed in the primary mirror 205 to a first relay mirror RM1' positioned behind the primary mirror 205. This first relay mirror RM1' has a concave spherical curvature and is stationary.

A second relay mirror RM2' receives the light from the first relay mirror RM1'. This second relay mirror RM2' is aspheric and concave. Its curvature is close to hyperbolic. The third relay mirror RM3', which receives light from the second relay mirror RM2', is convex with an oblate spheroid curvature.

Finally, a fourth relay RM4' having a concave curvature receives light from the third relay RM3' and reflects it onto an focal surface FS, which is stationary as zoom progresses. The fourth relay mirror RM4' has a simple spherical curvature.

Figure 7:
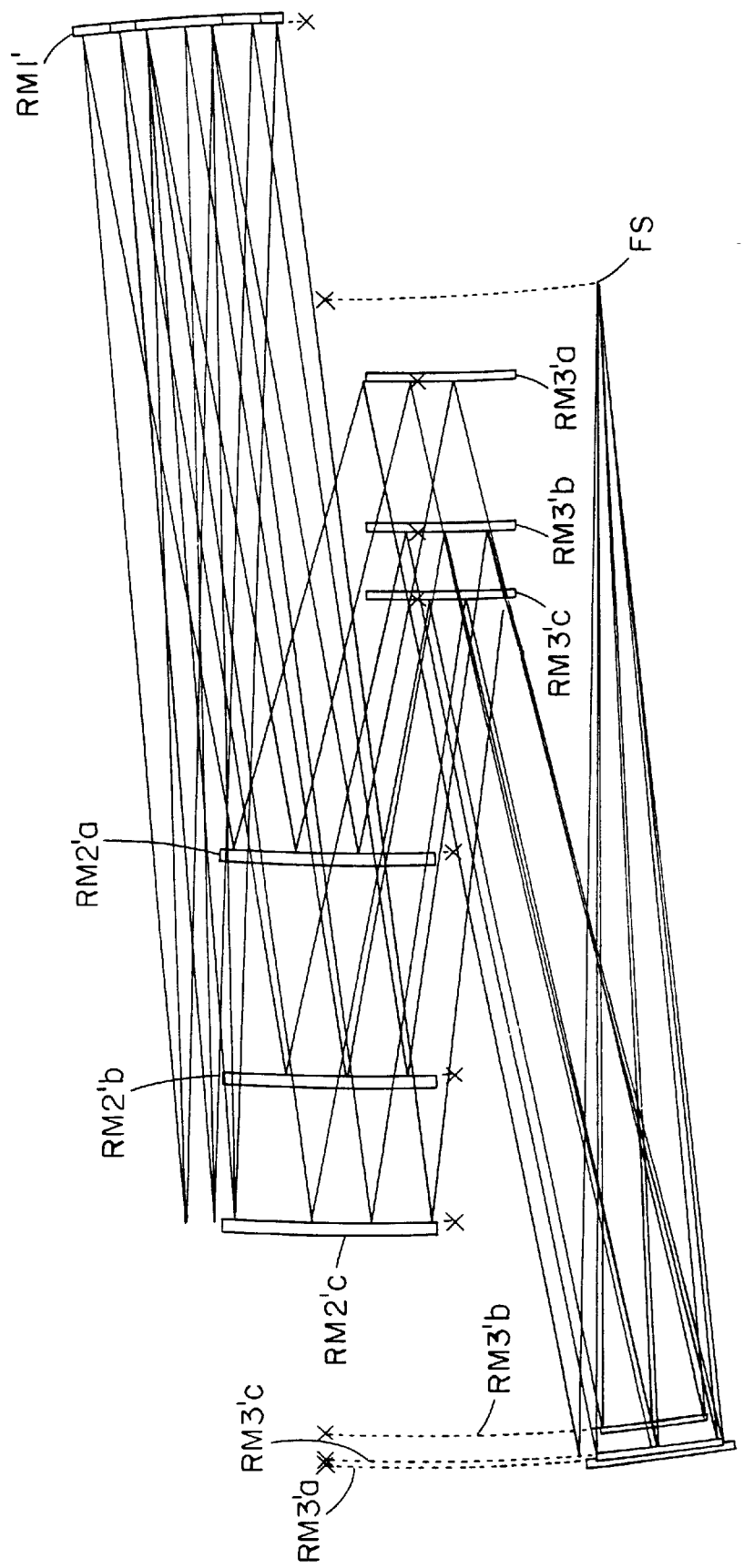
FIG. 7 is a side view of the relay mirrors of the second embodiment at the three exemplary zoom positions.

The second, third, and fourth relay mirrors RM2', RM3', and RM4' are movable to provide the zoom function. As the telescopic system is zoomed through its range, each of second through fourth relay mirrors moves varying amounts, but each of the mirrors move along mutually parallel tracks 250, 252, 254. FIG. 7 shows the relay mirror positions for f-stops of 8.42, 10.0, and 11.42, respectively. This movement yields a zoom range of 1.4:1, which will maintain a constant ground sample distance with obliquities to 45°.

Specifically, if the second, third, and fourth relay mirrors are at positions RM2'a, RM3'a, and RM4'a the effective f-stop is 8.42. Positions RM2'b, RM3'b, RM4'b yield an f-stop of 10.0, and RM2'c, RM3'c, RM4'c give an f-stop of 11.42.

The focal surface FS is curved both spherically and aspherically. Again, although the focal surface does not change as zoom progresses, the line of sight changes by several tenths of a degree. Further, the entrance aperture remains constant across the zoom range so that angular resolution is maintained.

The following TABLES IV and V summarize the mirror curvatures for a system having a focal length of 100.0 lens units at an f-stop of 8.4 and a field of view of +/−0.022 radians.

TABLE IV

| Description | Radius | Thickness | Index | Tilt | Decenter |
|---|---|---|---|---|---|
| Primary | −49.9878 | −20.0855 | −1.0 | — | — |
| Secondary | −12.5504 | −30.0771 | +1.0 | −0.48488E−3 | — |
| RM1' | −13.9143 | −5.1942 | −1.0 | 0.29298E−1 | −0.1889E−2 |
| RM2' | 23.9055 | 2.9336 | +1.0 | 0.89274E−2 | −0.87549 |
| RM3' | 8.8092 | −6.7346 | −1.0 | −0.30791E−2 | −0.65879 |
| RM4' | 10.2646 | 7.2463 | +1.0 | −0.63802E−1 | −0.89448E−1 |
| FS | 14.1270 | — | — | — | −0.11651 |

TABLE V

| | Aspheric Surfaces | | |
|---|---|---|---|
| | Conic Constant | A4 | A6 |
| Primary | −1.00016 | 0.284771E−7 | 0.164556E−10 |
| Secondary | −1.03499 | 0.107770E−3 | −0.421084E−6 |
| RM1' | −38.8240 | 0.282942E−3 | −0.640832E−5 |
| RM3' | 5.88226 | −.794994E−3 | −0.550291E−4 |
| IS | −0.794994E−3 | 0.464797E−3 | −0.74795E−4 |

Figure 8:
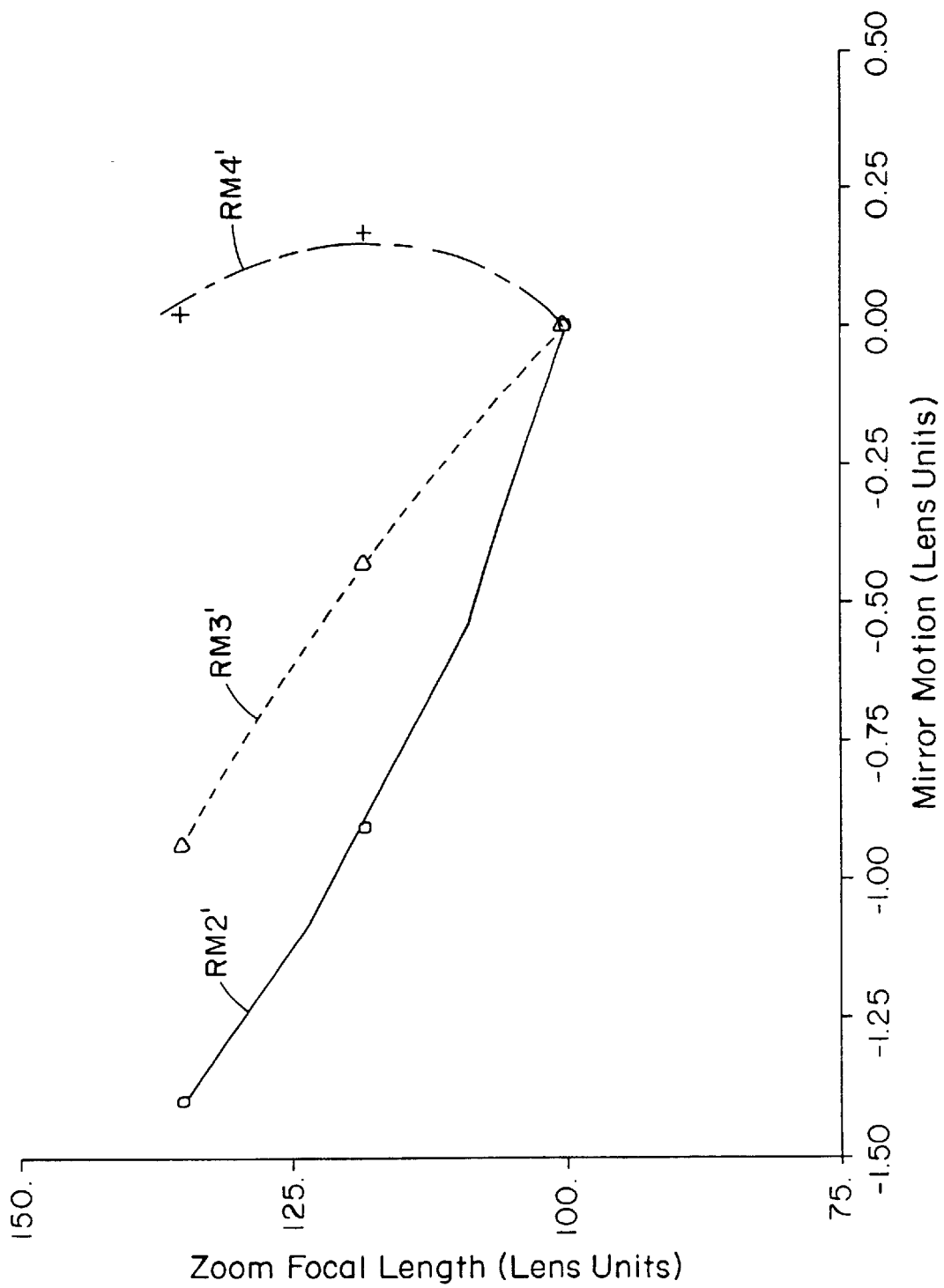
FIG. 8 is a graph illustrating focal length as a function of mirror motion for the second, third, and fourth relay mirrors in the second embodiment.

FIG. 8 is a graph of the focal length of the system as a function of mirror movement of the second RM2', third RM3', and fourth RM4' relay mirrors in the normalized scale of lens units.

Figure 9:
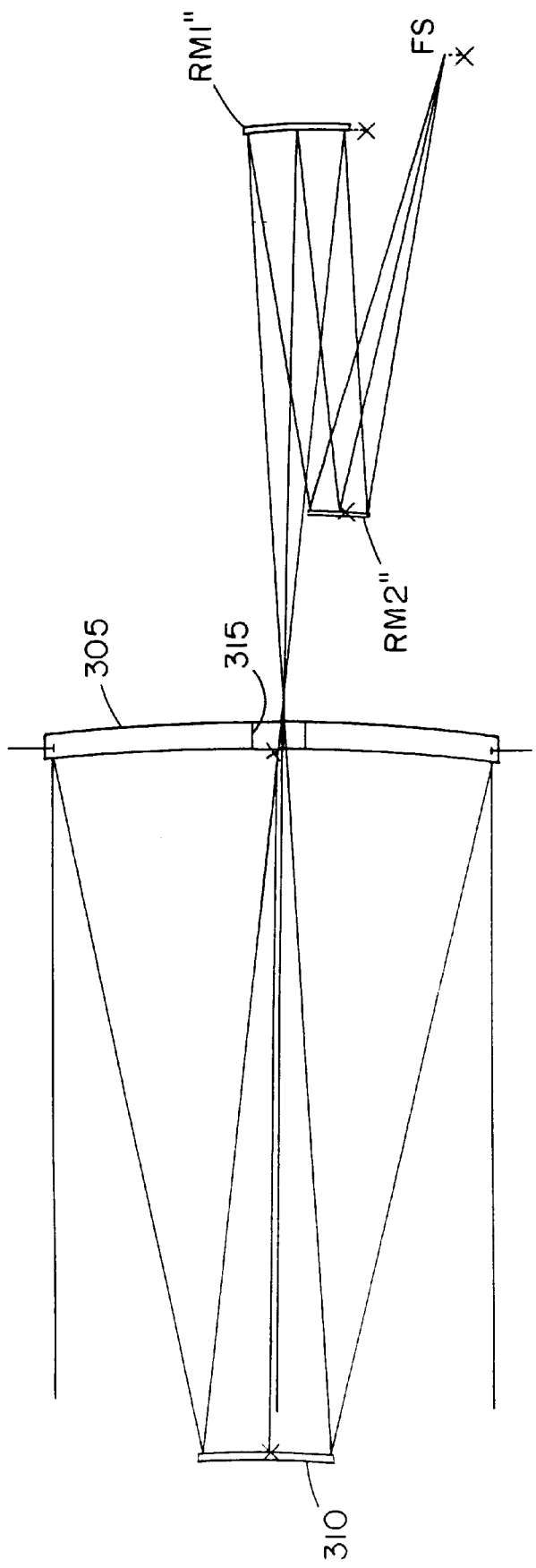
FIG. 9 is a side view of the third embodiment of the inventive zoom optical reflective system at an intermediate zoom position.
Figure 10:
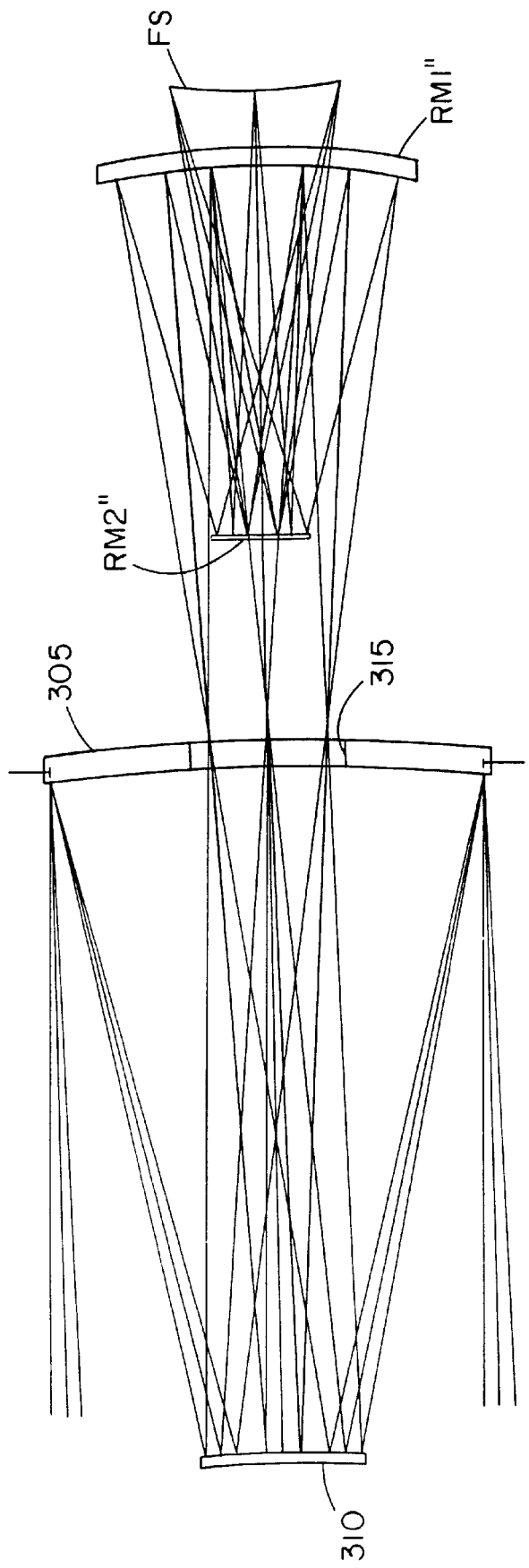
FIG. 10 is a top view of the third embodiment of the zoom optical reflective system at the intermediate zoom position.

Turning now to FIGS. 9 and 10, a side and top view, respectively, of third embodiment of the inventive system is shown. This third embodiment of the inventive system is shown. This third embodiment maintains the Cassegrain front end including a primary mirror 305 and a secondary mirror 310, but instead of four relay mirrors, only two aspheric relay mirrors are used. Specifically, a first relay mirror RM1" receives the light from the secondary mirror 310 through an aperture 315 of the primary mirror 305. This first relay mirror RM1" is concave with a general aspheric curvature. A second relay mirror RM2" receives the light reflected by the first relay mirror RM1" and directs it to a fixed focal surface FS. The second relay mirrors RM2" also has a general aspheric curvature. In comparison with the second embodiment system, the two mirror relay is substantially longer.

Figure 11:
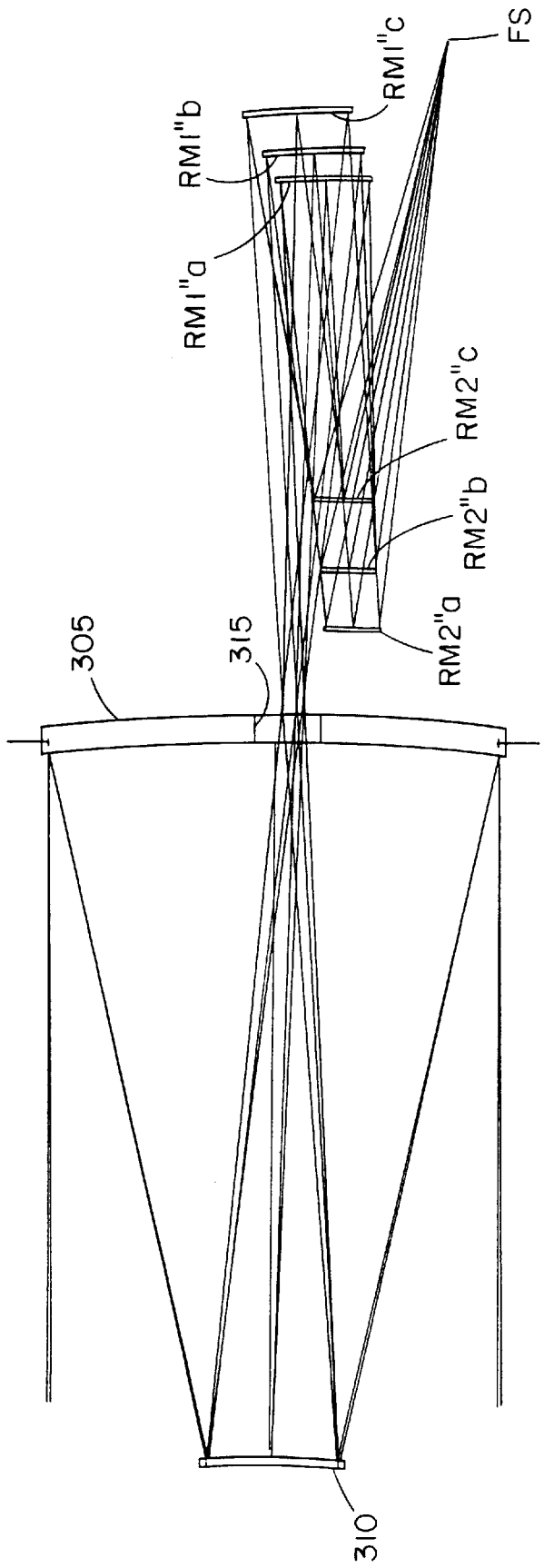
FIG. 11 is a side view of the second embodiment showing the three exemplary zoom positions simultaneously.

FIG. 11 shows the two mirror relay section of the third embodiment at three possible zoom settings i.e. f-stops of 8.4, 10.0, and 11.42. Specifically, RM1"a and RM2"a are the positions of the first and second relay mirrors for an f-stop of 8.42; RM1"b and RM2"b correspond to an f-stop of 10.0 and RM1"c and RM2"c correspond to an f-stop of 11.42. Here again, the focal surface FS is fixed for all zoom positions.

Tables VI and VII set forth the lens curvatures in a normalized scale of 100.0 lens units at an f-stop of 8.3 with a maximum field of view of +/−0.023 radians.

TABLE VI

| Description | Radius | Thickness | Index | Tilt | Decenter |
|---|---|---|---|---|---|
| Primary | −55.5476 | −19.7256 | −1.0 | — | — |
| Secondary | −25.9706 | +37.1403 | +1.0 | −0.014967 | −2.3823 |
| RM1" | −19.7006 | −10.6741 | −1.0 | −0.044252 | −1.9499 |
| RM2" | +171.3684 | +12.7803 | +1.0 | −0.041896 | −4.9959 |
| FS | +13.9632 | — | — | — | — |

TABLE VII

| | Aspheric Surfaces | | |
|---|---|---|---|
| | Conic Constant | A4 | A6 |
| Primary | −1.13701 | −0.146316E−6 | −0.491552E−11 |
| Secondary | −2.92913 | 0.639009E−5 | −0.457040E−7 |
| RM1" | −3.25903 | −0.423483E−4 | 0.106308E−6 |
| RM2" | −0.939589 | 0.110288E−3 | −0.247716E−5 |
| FS | 0.0 | −0.319432E−3 | 0.143885E−4 |

Figure 12:
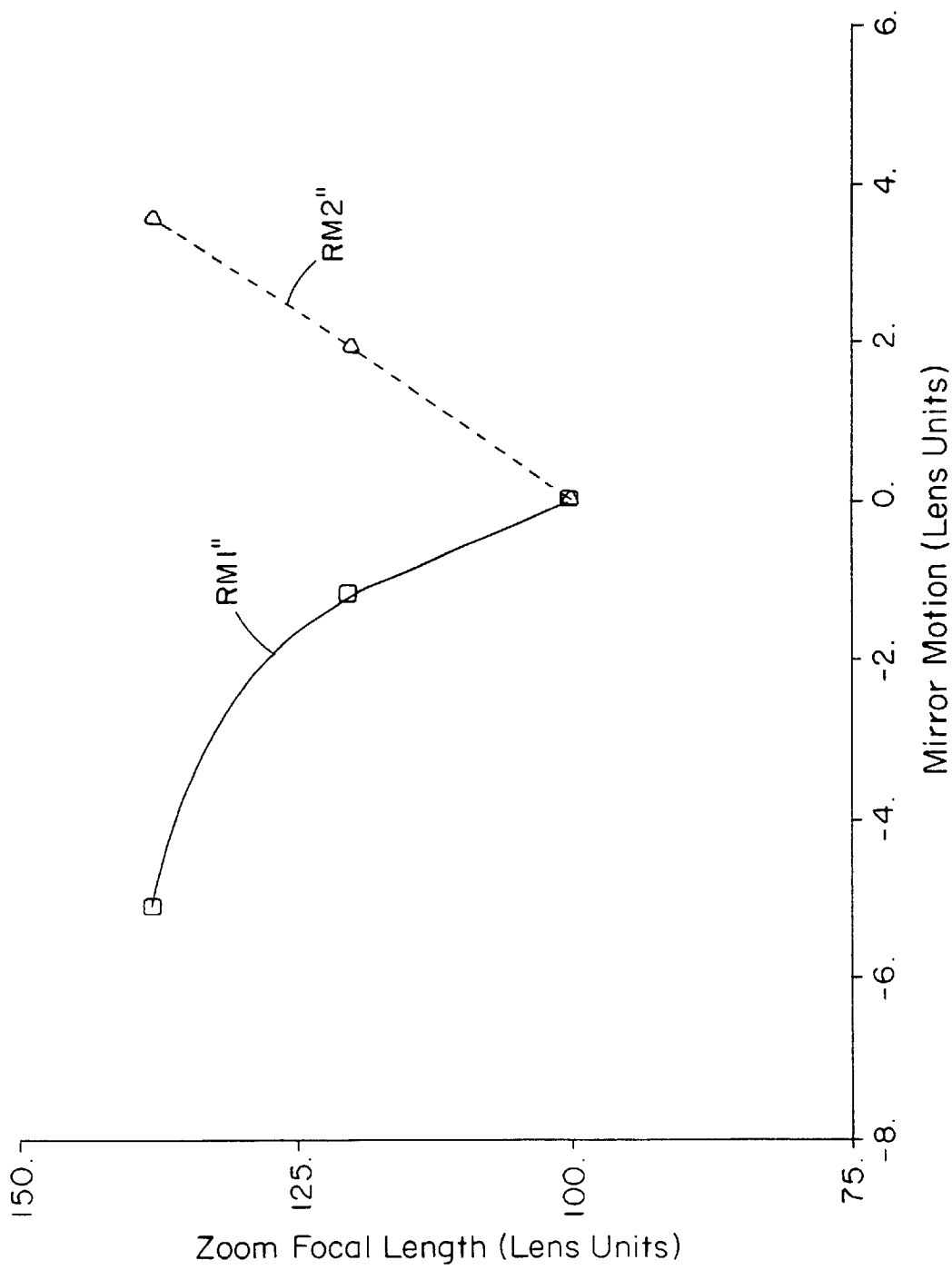
FIG. 12 is a graph illustrating focal length as a function of mirror motion for first and second relay mirrors in the third embodiment.

FIG. 12 is a graph of the system focal length as a function of mirror movement of the first RM1" and second RM2" relay mirrors in the normalized scale of lens units for the third embodiment.

Those skilled in the art will know or be able to ascertain using no more than routine experimentation, many equivalents to the specific embodiments of the invention described herein. These and all other equivalents are intended to be encompassed by the followed claims.

What is claimed is:

1. A reflective zoom optical system comprising:
   a primary mirror for collecting and reflecting electromagnetic radiation entering the system through an entrance aperture;
   a secondary mirror for receiving the electromagnetic radiation from the primary mirror and reflecting the electromagnetic radiation;
   a focal surface; and
   a plurality of curved relay mirrors successively reflecting electromagnetic radiation received from the secondary mirror to generate a real image with the electromagnetic radiation at the focal surface, the curved relay mirrors being movable in relationship to each other in order to effect magnification, wherein the plurality of curved relay mirrors comprises: an initial mirror for receiving the electromagnetic radiation from the secondary mirror, and a final mirror for generating the real image at the focal surface, wherein the initial and final mirrors have aspheric curvatures with only bilateral symmetry.

2. A system as claimed in claim 1, wherein the focal surface remains fixed as the curved relay mirrors move in relationship to each other producing the change in magnification.

3. A system as claimed in claim 1, wherein the entrance aperture size remains fixed as the curved relay mirrors move in relationship to each other producing the change in magnification.

4. A system as claimed in claim 1, wherein the primary mirror and the secondary mirror are coaxial.

5. A system as claimed in claim 1, wherein the curvatures and mutual relationship of the primary mirror and the secondary mirror yield a Cassegrain front end of the system.

6. A system as claimed in claim 1, wherein the plurality of curved relay mirrors comprises:

a first relay mirror;

a second relay mirror receiving the electromagnetic radiation from the first relay mirror;

a third relay mirror receiving the electromagnetic radiation from the second relay mirror; and a fourth relay mirror receiving the electromagnetic radiation from the third relay mirror and reflecting the electromagnetic radiation onto the focal surface.

7. A system as claimed in claim 6, wherein the first and fourth relay mirrors have aspheric curvatures with only bilateral symmetry.

8. A system as claimed in claim 6, wherein the second relay mirror has a convex curvature.

9. A system as claimed in claim 8, wherein the second and the third relay mirrors move in parallel tracks.

10. A system as claimed in claim 6, wherein the second and the third relay mirrors move to effect the magnification.

11. A system as claimed in claim 10, wherein the second and the third relay mirrors move in parallel tracks.

12. A system as claimed in claim 11, wherein the third relay mirror has a spherical curvature.

13. A system as claimed in claim 12, wherein the focal surface has an aspheric curvature with only bilateral symmetry.

14. A system as claimed in claim 13, further comprising a fold mirror between the secondary mirror and the first relay mirror for directing the electromagnetic radiation laterally.

15. A system as claimed in claim 6, wherein the third relay mirror has a spherical curvature.

16. A system as claimed in claim 6, wherein the focal surface has an aspherical curvature with only bilateral symmetry.

17. A system as claimed in claim 6, further comprising a fold mirror between the secondary mirror and the first relay mirror for directing the electromagnetic radiation laterally.

18. A system as claimed in claim 1, wherein the system is all-reflective.

19. An all-reflective zoom optical system comprising:

a primary mirror for collecting and reflecting electromagnetic radiation entering the system;

a stationary secondary mirror, coaxial with the primary mirror, for receiving the electromagnetic radiation from the primary mirror and reflecting the electromagnetic radiation coaxially through a center of the primary mirror;

a focal surface having an aspherical curvature with only bilateral symmetry; and a plurality of curved relay mirrors, positioned behind the primary mirror, receiving and successively reflecting the electromagnetic radiation from the secondary mirror, the curved relay mirrors being movable in relationship to each other in order to effect magnification, wherein the curved relay mirrors generate a real image at the focal surface.

20. A system as claimed in claim 19, wherein the focal surface remains fixed as the curved relay mirrors move in relationship to each other producing the change in magnification.

21. A system as claimed in claim 19, wherein the plurality of curved relay mirrors comprises:

a first relay mirror;

a second relay mirror receiving the electromagnetic radiation from the first relay mirror;

a third relay mirror receiving the electromagnetic radiation from the second relay mirror; and a fourth relay mirror receiving the electromagnetic radiation from the third relay mirror and reflecting the electromagnetic radiation onto the focal surface.

22. A system as claimed in claim 21, wherein the first and fourth relay mirrors have aspheric curvatures with only bilateral symmetry.

23. A system as claimed in claim 21, wherein the second relay mirror has a convex curvature.

24. A system as claimed in claim 21, wherein the second and the third relay mirrors move to effect the magnification.

25. A system as claimed in claim 24, wherein the second and the third relay mirrors move in parallel tracks.

26. A system as claimed in claim 21, wherein the third relay mirror has a spherical curvature.

27. A system as claimed in claim 21, further comprising a fold mirror between the secondary mirror and the first relay mirror for directing the electromagnetic radiation laterally.

\* \* \* \* \*